United States Patent
Lin et al.

(10) Patent No.: US 10,043,077 B2
(45) Date of Patent: Aug. 7, 2018

(54) VISUAL POSITIONING APPARATUS, METHOD, AND NON-TRANSITORY COMPUTER READABLE STORAGE MEDIUM THEREOF

(71) Applicant: Institute For Information Industry, Taipei (TW)

(72) Inventors: Ching-Wen Lin, New Taipei (TW); Ming-Fang Weng, Kinmen County (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/347,356

(22) Filed: Nov. 9, 2016

(65) Prior Publication Data
US 2018/0107875 A1    Apr. 19, 2018

(30) Foreign Application Priority Data
Oct. 19, 2016 (TW) .............................. 105133702 A (51) Int. Cl.
| | |
|---|---|
| *G06K 9/00* | (2006.01) |
| *G06K 9/20* | (2006.01) |
| *G06K 9/36* | (2006.01) |
| *G06K 9/46* | (2006.01) |
| *G06T 7/00* | (2017.01) |

(52) U.S. Cl.
CPC ....... *G06K 9/00671* (2013.01); *G06K 9/4604* (2013.01); *G06T 7/0042* (2013.01); *G06T 2207/10004* (2013.01); *G06T 2207/30208* (2013.01)

(58) Field of Classification Search
CPC . G06T 7/70; G06F 17/30241; G06F 17/3028; G06F 17/30377; G06K 9/18
USPC .......... 382/103, 164, 165, 282, 291; 348/56; 235/375, 487, 462.04; 704/246
See application file for complete search history.

(56) References Cited

U.S. PATENT DOCUMENTS

| | | | |
|---|---|---|---|
| 7,519,218 B2 * | 4/2009 | Takemoto | ............ G02B 27/017 382/165 |
| 7,769,236 B2 | 8/2010 | Fiala | |
| | | (Continued) | |

FOREIGN PATENT DOCUMENTS

WO     2014167387 A1     10/2014

*Primary Examiner* — Charlotte M Baker
(74) *Attorney, Agent, or Firm* — Skaar Ulbrich Macari, P.A.

(57) ABSTRACT

A visual positioning apparatus, method, and non-transitory computer readable storage medium thereof are provided. The visual positioning apparatus derives an image by sensing a visual code marker in a space and performs the following operations: (a) identifying an identified marker image included in the image, (b) searching out the corner positions of the identified marker image, (c) deciding a marker structure of the identified marker image according to the corner positions, wherein the marker structure includes vertices, (d) selecting a portion of the vertices as first feature points, (e) searching out a second feature point for each first feature point, (f) updating the vertices of the marker structure according to the second feature points, (g) selecting a portion of the updated vertices as the third feature points, and (h) calculating the position of the visual positioning apparatus according to the third feature points.

12 Claims, 6 Drawing Sheets

(56) References Cited

U.S. PATENT DOCUMENTS

| | | | |
|---|---|---|---|
| 7,978,911 B2* | 7/2011 | Cheong | G06K 7/14 235/462.04 |
| 8,517,253 B2* | 8/2013 | Johnson | G09B 21/006 235/375 |
| 9,368,117 B2* | 6/2016 | Liu | H04R 3/005 |
| 2008/0232645 A1* | 9/2008 | Billinghurst | G06K 9/32 382/103 |
| 2016/0100104 A1* | 4/2016 | Furumura | G06T 3/0062 348/36 |

* cited by examiner

VISUAL POSITIONING APPARATUS, METHOD, AND NON-TRANSITORY COMPUTER READABLE STORAGE MEDIUM THEREOF

PRIORITY

This application claims priority to Taiwan Patent Application No. 105133702 filed on Oct. 19, 2016, which is hereby incorporated by reference in its entirety herein.

FIELD

The present invention relates to a visual positioning apparatus, method, and a non-transitory computer readable storage medium thereof. More particularly, the present invention relates to a visual positioning apparatus, method, and a non-transitory computer readable storage medium thereof that based on a visual code marker.

BACKGROUND

With the rapid development of the science and technology, computer vision and/or image processing technologies have been gradually used in positioning of various electronic products (e.g., various mobile apparatus, and wearable equipments of augmented reality) and, thereby, providing various services for users depending on the positions of the users (e.g., positioning the location of the user and providing a guided path for the user when he/she is visiting an exhibit).

The conventional visual positioning technology combines the special image label (e.g., a visual code marker) with the image detecting technology. Specifically, the conventional technology uses an electronic product with the camera function to sense a visual code marker to derive an image. Then, the electronic product identifies a marker image comprised in the image and calculates the position of the electronic product in the space by the computer visual technology according to four corner positions of the marker image, the actual size of the visual code marker, and the camera calibration information. However, the image of the visual code marker captured by the electronic product may be vague, which results in the situation that the marker image cannot be identified accurately and/or the four corner positions of the marker image cannot be detected accurately. In this case, the electronic product cannot be positioned accurately.

Accordingly, the technique that can reduce the inaccuracy of a sensed image of a special image label to obtain a more accurate positioning result is still in an urgent need.

SUMMARY

To address the aforesaid problems, the present invention provides a visual positioning apparatus, a visual positioning method, and a non-transitory computer readable storage medium thereof.

The visual positioning apparatus according to an example embodiment comprises an image sensor and a processor, wherein the processor is electrically connected to the image sensor. The image sensor derives an image by sensing a visual code marker in a space. The processor executes the following operations: (a) identifying an identified marker image comprised in the image, (b) searching out a plurality of corner positions of the identified marker image, (c) deciding a marker structure of the identified marker image according to the corner positions, wherein the marker structure comprises a plurality of vertices, (d) selecting a portion of the vertices as a plurality of first feature points according to an identifier of the identified marker image, (e) searching out a second feature point from a preset searching range for each of the first feature points, (f) updating the vertices of the marker structure according to the second feature points, (g) selecting a portion of the updated vertices as a plurality of third feature points, and (h) calculating a position of the visual positioning apparatus in the space according to the third feature points.

A visual positioning method according to an example embodiment of the present invention is adapted to use in an electronic apparatus. The visual positioning method in an example embodiment comprises the: (a) deriving an image by sensing a visual code marker in a space, (b) searching out a plurality of corner positions of the identified marker image, (c) deciding a marker structure of the identified marker image according to the corner positions, wherein the marker structure comprises a plurality of vertices, (d) selecting a portion of the vertices as a plurality of first feature points according to an identifier of the identified marker image, (e) searching out a second feature point from a preset searching range for each of the first feature points, (f) updating the vertices of the marker structure according to the second feature points, (g) selecting a portion of the updated vertices as a plurality of third feature points, and (h) calculating a position of the visual positioning apparatus in the space according to the third feature points.

A non-transitory computer readable storage medium according to an example embodiment of the present invention includes a computer program stored therein. The computer program in an example embodiment executes a positioning method after being loaded into an electronic device. The positioning method in an example embodiment comprises: (a) deriving an image by sensing a visual code marker in a space, (b) searching out a plurality of corner positions of the identified marker image, (c) deciding a marker structure of the identified marker image according to the corner positions, wherein the marker structure comprises a plurality of vertices, (d) selecting a portion of the vertices as a plurality of first feature points according to an identifier of the identified marker image, (e) searching out a second feature point from a preset searching range for each of the first feature points, (f) updating the vertices of the marker structure according to the second feature points, (g) selecting a portion of the updated vertices as a plurality of third feature points, and (h) calculating a position of the visual positioning apparatus in the space according to the third feature points.

According to the above descriptions, the visual positioning technology according to the present invention searches out a plurality of corner positions of the identified marker image, decides a marker structure according to the corner positions, decides a plurality of first feature points according to the marker structure, searches out a nearby second feature point for each of the first feature points, updates the marker structure according to the second feature points, and decides a plurality of third feature points according to the updated marker structure. By deciding the feature points for several times, the positions of the finally decided third feature points are closer to the position of the actual feature points of the identified marker image and, thereby, the position of the visual positioning apparatus in the space can be determined more accurately.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a visual positioning apparatus, method, and a non-transitory computer readable storage medium thereof provided in the present invention will be explained with reference to certain example embodiments thereof. However, these example embodiments are not intended to limit the present invention to any specific examples, embodiments, environment, applications, or implementations described in these example embodiments. Therefore, description of these example embodiments is only for purpose of illustration rather than to limit the scope of the present invention. It shall be appreciated that, in the following embodiments and the attached drawings, elements unrelated to the present invention are omitted from depiction.

Figure 1A:
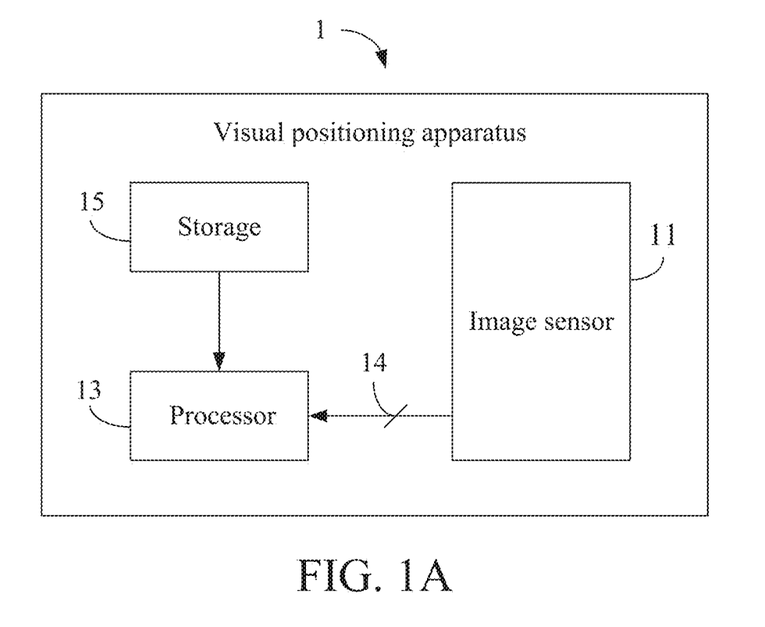
FIG. 1A illustrates the architecture of a visual positioning apparatus 1 according to a first embodiment of the present invention.

A first embodiment of the present invention is a visual positioning apparatus 1 and a schematic view of which is depicted in FIG. 1A. The visual positioning apparatus 1 comprises an image sensor 11, a processor 13, and a storage 15, wherein the processor 13 is electrically connected to the image sensor 11 and the storage 15. The image sensor 11 may be any kinds of charge-coupled devices (CCDs), complementary metal-oxide-semiconductor (CMOS) photosensitive devices, or other image sensing apparatuses capable of capturing images known to those of ordinary skill in the art. The processor 13 may be any kinds of processing units, central processing units (CPUs), microprocessors, or other computing devices known to those of ordinary skill in the art. The storage 15 may be a memory, a universal serial bus (USB) disk, a hard disk, a compact disk (CD), a mobile disk, or any other storage media or circuits with the same function and known to those of ordinary skill in the art. Please note that the storage 15 may be disposed outside the visual positioning apparatus 1 in other embodiments.

Figure 1B:
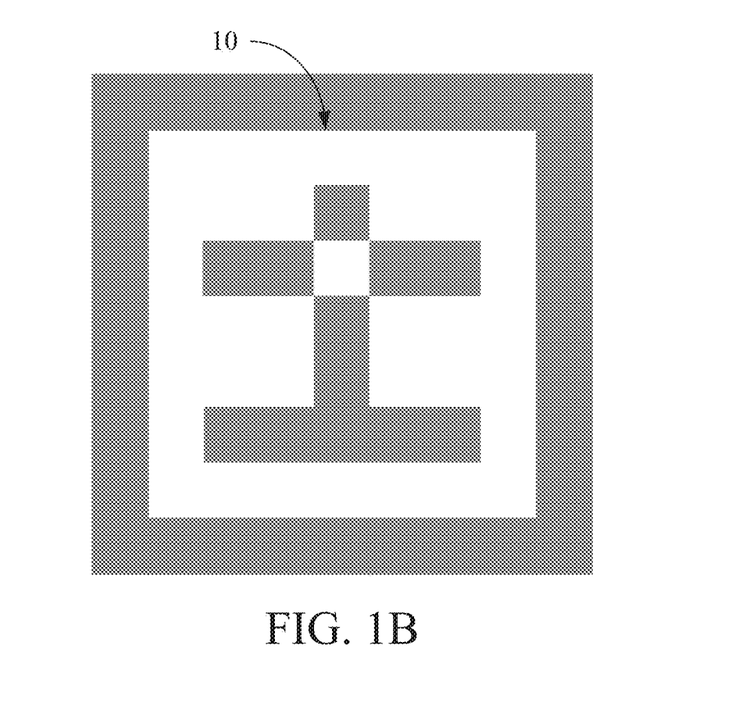
FIG. 1B depicts a schematic view of a visual code marker 10.
Figure 1C:
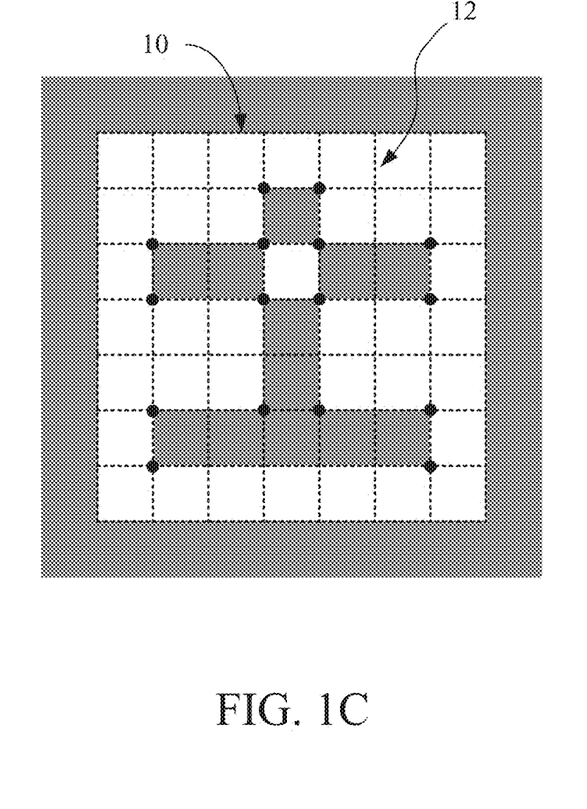
FIG. 1C depicts the visual code marker 10, a mesh 12 formed by a preset structure, and 16 feature points defined for the visual code marker 10.

In this embodiment, the visual positioning apparatus 1 is used with a plurality of visual code markers (e.g., augmented reality markers, but not limited thereto), wherein each of the visual code markers is designed based on a preset structure. A concrete example is described herein with reference to a visual code marker 10 depicted in FIG. 1B. The visual code marker 10 consists of 7 by 7 blocks, wherein the border of the visual code marker 10 are the blocks in light color and each of the inner 5 by 5 blocks may be in dark or light color. The preset structure is a mesh having a plurality of vertices. Based on this preset structure, each visual code marker is defined with a plurality of feature points. In an embodiment, a vertex may be the vertex of a block in dark color among the middle 5 by 5 blocks. In a visual code marker, each feature point is a position that is more distinguishable than other positions in the visual code maker (e.g., a position at which the brightness varies more severely, which shall be located at a vertex of the mesh). Please refer to FIG. 1C, which depicts the visual code marker 10, a mesh 12 (i.e., the grids) formed by a preset structure for designing the visual code marker 10, and 16 feature points defined for the visual code marker 10 (i.e., the positions labeled by 16 black dots). It shall be appreciated that the visual code marker 10, the mesh 12, and the 16 feature points depicted in FIG. 1C are only used for illustration and not intended to limit the scope of the present invention. Moreover, different visual code markers may be defined with different numbers of feature points. Furthermore, in different embodiments, a same visual code marker may be defined with different numbers of feature points. For each visual code marker, the storage 15 stores an identifier, an image of the visual code marker, and a plurality of feature point positions (i.e., which vertices on the preset structure are the feature points).

Figure 1D:
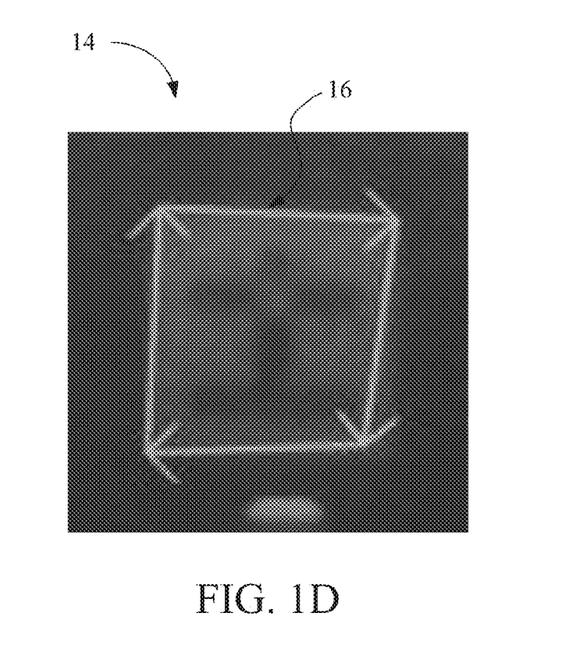
FIG. 1D depicts an image 14 sensed by the visual positioning apparatus 1 and an identified marker image 16 comprised in the image 14.

In this embodiment, the visual code marker may be placed in a space (e.g., put up on a wall in a space). The image sensor 11 of the visual positioning apparatus 1 derives an image 14 by sensing a visual code marker in the space as shown in FIG. 1D. The processor 13 identifies an identified marker image 16 (i.e., the region enclosed by four arrows in FIG. 1D) comprised in the image 14 after receiving the image 14 from the image sensor 11. For example, the processor 13 may identify the identified marker image 16 in the image 14 by comparing the image 14 with the images of the visual code markers stored in the storage 15. After identifying the identified marker image 16, the processor 13 can determine the identifier (not shown) corresponding to the identified marker image 16.

Figure 1E:
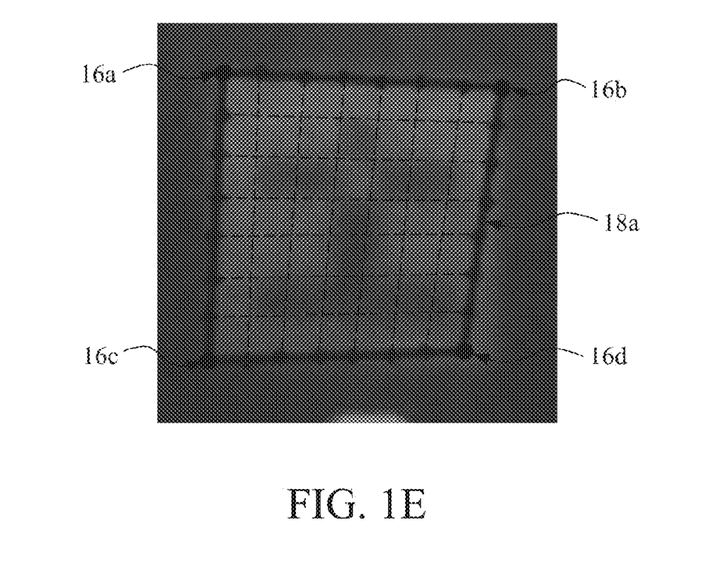
FIG. 1E depicts the corner positions 16a, 16b, 16c and 16d and a marker structure 18a of the identified marker image 16.

Thereafter, the processor 13 searches out the corner positions 16a, 16b, 16c, and 16d of the identified marker image 16 (i.e., the positions of the four corners of the identified marker image 16) as shown in FIG. 1E. For example, the processor 13 may calculate the gradient of the brightness of the image 14 and then determine the corner positions 16a, 16b, 16c, and 16d according to the gradient of the brightness. It shall be appreciated that the algorithm used to search out the corners of the identified marker image 16 is not the focus of the present invention. In other words, the present invention is not limited to searching out the corner positions by using the gradient of the brightness. Additionally, the present invention does not limit the number of corners of the identified marker image that the processor 13 will search out. That is, the number of the corner positions being four in the above case is only an example for illustration.

Then, the processor 13 decides a marker structure 18a (i.e., the grids in FIG. 1E) of the identified marker image 16 according to the corner positions 16a, 16b, 16c, and 16d, wherein the marker structure 18a comprises a plurality of vertices. Specifically, since the visual code markers used with the visual positioning apparatus 1 are all designed based on a preset structure, the processor 13 decides the marker structure 18*a* of the identified marker image 16 according to the information of the preset structure. Here, it is assumed that the preset structure specifies that each visual code marker consists of 7 by 7 blocks. Based on this preset structure, the processor 13 defines 7 by 7 grids by taking the corner positions 16*a*, 16*b*, 16*c*, and 16*d* as four corners and the mesh formed by the 7 by 7 grids is the marker structure 18*a*.

Figure 1F:
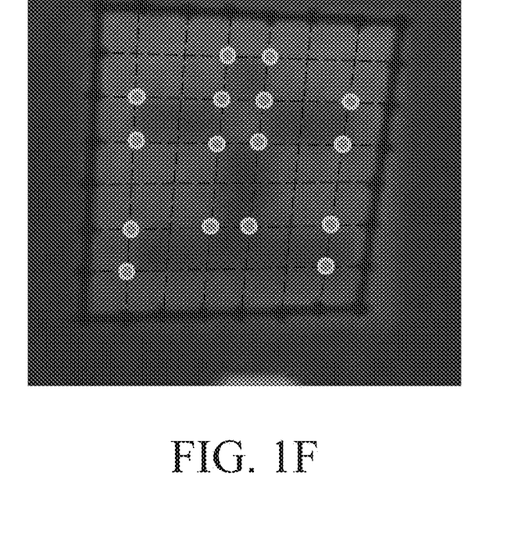
FIG. 1F is a schematic view of a plurality of first feature points.

Thereafter, the processor 13 selects a portion of the vertices of the marker structure 18*a* as a plurality of first feature points of the identified marker image 16 according to the identifier of the identified marker image 16. Specifically, the processor 13 may retrieve the feature point positions corresponding to the identifier from the storage 15 according to the identifier of the identified marker image 16 and then take the vertices on the marker structure 18*a* that correspond to the feature point positions as the first feature points. In this embodiment, the processor 13 decides the first feature points on the marker structure 18*a* according to all of the feature point positions corresponding to the identifier. However, in other embodiments, the processor 13 may decide the first feature points on the marker structure 18*a* according to a portion of the feature point positions corresponding to the identifier (e.g., by randomly selecting a portion of the feature point positions according to the Random Sample Consensus (RANSAC) algorithm). For ease of understanding, please refer to FIG. 1C and FIG. 1F for a concrete example. In this example, the storage 15 stores the feature point positions of the 16 feature points of the preset structure 12 and the processor 13 takes the vertices on the marker structure 18*a* that correspond to the positions of the 16 feature points as the first feature points. In FIG. 1F, the 6 dots in light color are the first feature points.

Figure 1G:
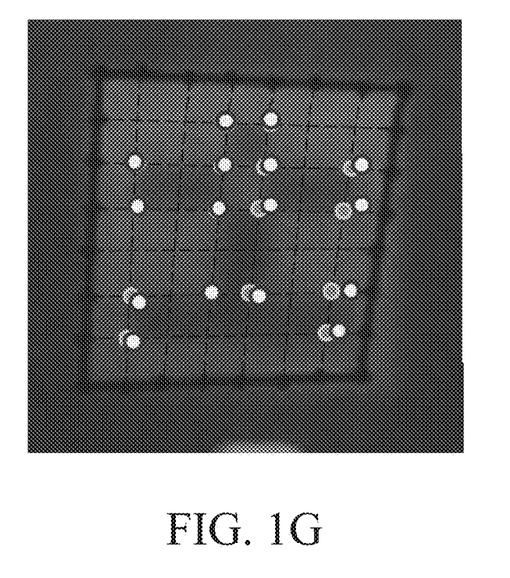
FIG. 1G is a schematic view of a plurality of second feature points.

Since the processor 13 decides the first feature points of the identified marker image 16 based on the marker structure 18*a* and the preset feature point positions, some first feature points may not be accurately located at the positions that are relatively distinguishable in the identified maker image 16. To solve the aforesaid problem, the processor 13 searches out a second feature point from a preset searching range for each of the first feature points (e.g., a circular range centered at the first feature point and having the radius of a quarter of the length of one grid) as shown in FIG. 1G. For example, for each first feature point, the processor 13 may search out a position at which the variation of the brightness is the largest from the preset searching range and take the position as the second feature point. Comparing to the first feature point, the second feature point is closer to the position of the actual feature point of the identified marker image 16.

Thereafter, the processor 13 updates the vertices of the marker structure 18*a* according to the second feature points. That is, the processor 13 updates the marker structure 18*a* to be the marker structure 18*b* shown in FIG. 1H according to the second feature points. For example, the processor 13 may use a regression algorithm (e.g., a linear square method) to update the vertices of the marker structure 18*a* according to the second feature points. Those of ordinary skill in the art should understand how to update the marker structure 18*a* according to the second feature points by the regression algorithm and, hence, the details are not described herein. Taking FIG. 1H as an example, the processor 13 may use the four second feature points 100*a*, 100*b*, 100*c*, and 100*d* among the second feature points to calculate a new regression line (i.e., the first longitudinal dashed line from the left) and this new regression line is a line in the marker structure 18*b*. Similarly, the processor 13 may calculate other new regression lines as the lines in the marker structure 18*b* according to other second feature points, whose details will not be further described herein.

Figure 1H:
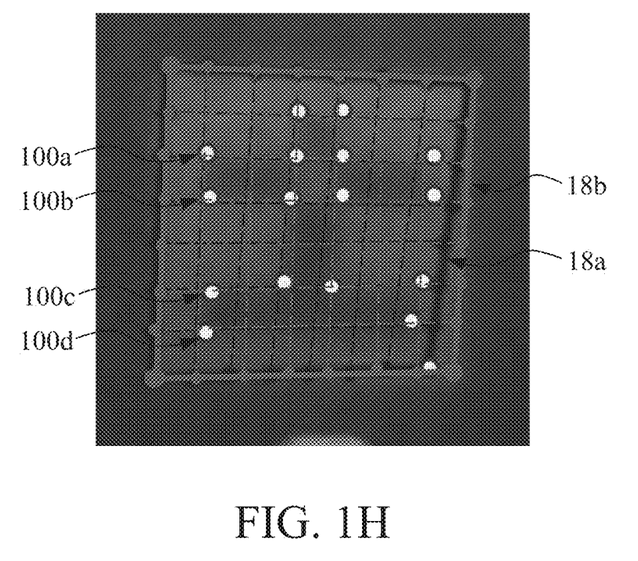
FIG. 1H is a schematic view of a marker structure 18b.
Figure 1I:
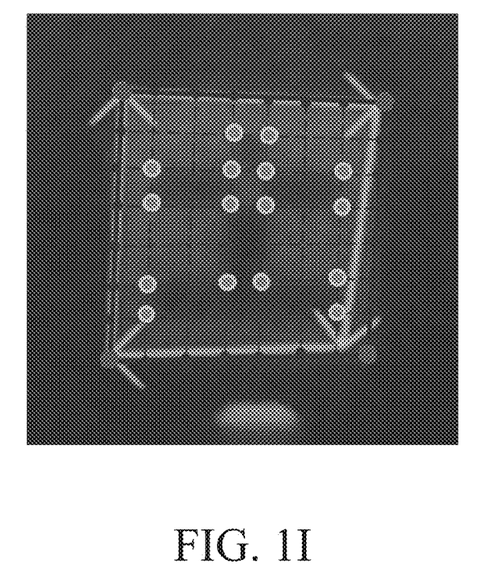
FIG. 1I is a schematic view of a plurality of third feature points.

Next, the processor 13 selects a portion of the updated vertices (i.e., the vertices of the marker structure 18*b*) as a plurality of third feature points. Similarly, the processor 13 may retrieve the feature point positions corresponding to the identifier from the storage 15 according to the identifier of the identified marker image 16 and then take the vertices on the marker structure 18*b* that correspond to the feature point positions as the third feature points. In this embodiment, the processor 13 decides the third feature points on the marker structure 18*b* according to all the feature point positions corresponding to the identifier as shown in FIG. 1I. However, in other embodiments, the processor 13 may decide the third feature points on the marker structure 18*b* according to a portion of the feature point positions corresponding to the identifier.

Then, the processor 13 calculates a position of the visual positioning apparatus 1 in the space according to the third feature points. For example, the processor 13 may calculate a position of the visual positioning apparatus 1 in the space according to the third feature points by using the Efficient Perspective-n-Point Camera Pose Estimation (EPnP) algorithm.

It shall be appreciated that, in some embodiments, the processor 13 may repeat the aforesaid operations of updating the marker structure and deciding the feature points in order to calculate the position of the visual positioning apparatus 1 in the space more accurately. Specifically, the processor 13 may calculate a position variation between the second feature points and the third feature points (i.e., calculate a difference between each second feature point and the corresponding third feature point and then calculate a sum of the differences as the position variation) and take the third feature points as the aforesaid first feature points. Then, the processor 13 again searches out a second feature point from a preset searching range for each of the first feature points, updates the vertices of the marker structure according to the second feature points, selects a portion of the updated vertices as a plurality of third feature points, and again calculates a position variation between the second feature points and the third feature points. The processor 13 repeats the aforesaid operations until the position variation is smaller than a preset value. After the position variation is smaller than the preset value, the processor 13 calculates the position of the visual positioning apparatus 1 in the space according to the third feature points finally obtained. By executing the aforesaid operations for several times, the processor 13 can find out the position closer to the actual feature points of the identified marker image 16 and, thereby, calculate the position of the visual positioning apparatus 1 in the space accurately.

It shall be additionally appreciated that, in some embodiments, the processor 13 may repeat the following operations for a predetermined number of times: searching out a second feature point from a preset searching range for each of the first feature points, updating the vertices of the marker structure according to the second feature points, and selecting a portion of the updated vertices as a plurality of third feature points. It shall be noted that, every time the processor 13 executes the next round of operations, the processor 13 takes the third feature points as the aforesaid first feature points. In this way, the processor 13 can find the position closer to the actual feature points of the identified marker image 16 by executing the operations for several times. In addition, when the aforesaid operations are executed repeatedly due to the error of the feature point is too large, the burden to the processor 13 and the required execution time can be reduced.

According to the above descriptions, the visual positioning apparatus 1 searches out the corner positions 16a, 16b, 16c, and 16d of the identified marker image 16, decides the marker structure 18a according to the corner positions 16a, 16b, 16c, and 16d, decides a plurality of first feature points according to the marker structure 18a, searches out a second feature point near each of the first feature points, updates the marker structure 18a to be the marker structure 18b according to the second feature points, and decides a plurality of third feature points according to the updated marker structure 18b. By deciding the feature points for several times, the position of the finally decided third feature points is closer to the position of the actual feature points of the identified marker image and, therefore, the position of the visual positioning apparatus 1 in the space can be decided more accurately.

Figure 2:
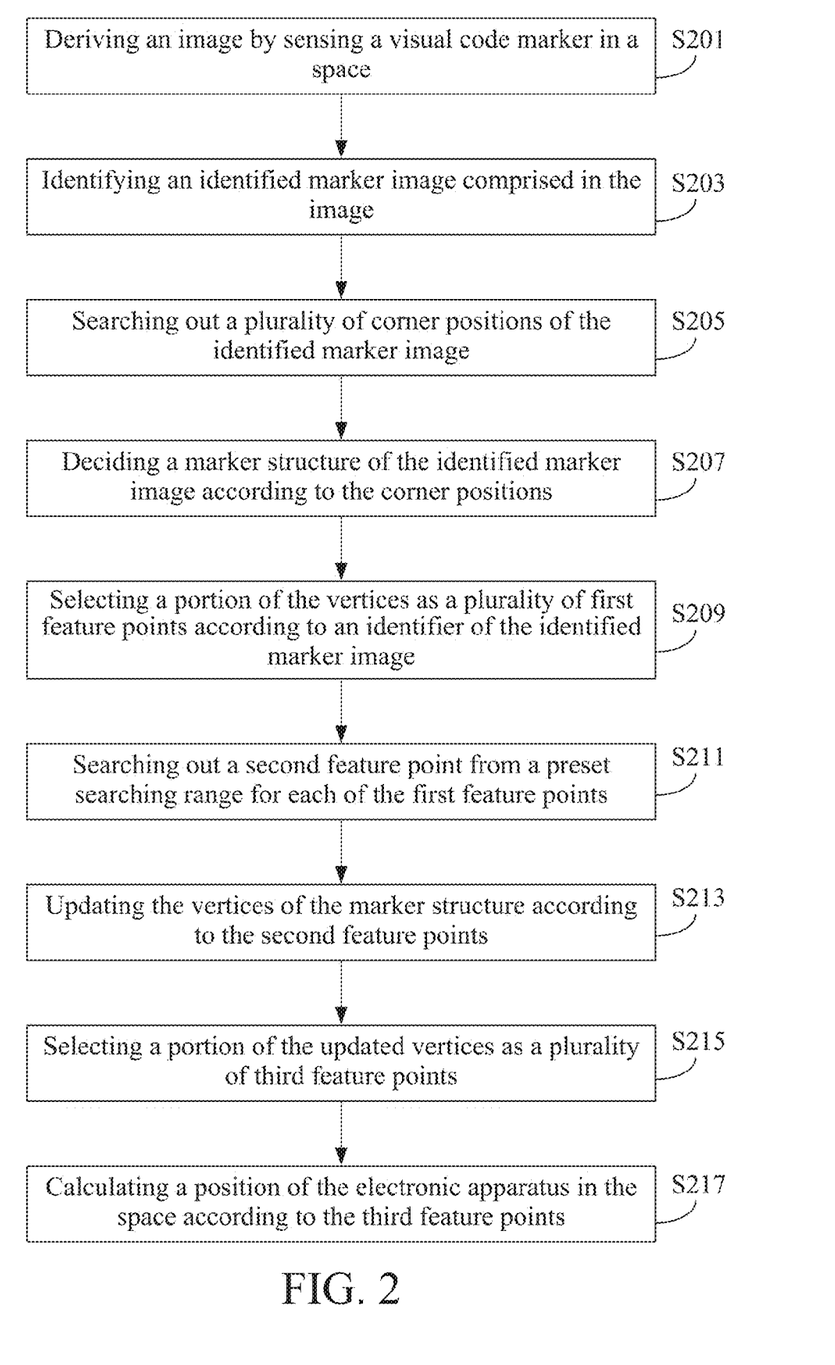
FIG. 2 is a flowchart of a visual positioning method according to a second embodiment of the present invention.

A second embodiment of the present invention is a visual positioning method and a flowchart of which is depicted in FIG. 2. The visual positioning method is adapted to use in an electronic apparatus (e.g., the visual positioning apparatus 1 of the first embodiment).

First, step S201 is executed by the electronic apparatus for deriving an image by sensing a visual code marker in a space. Next, step S203 is executed by the electronic apparatus for identifying an identified marker image comprised in the image. Thereafter, step S205 is executed by the electronic apparatus for searching out a plurality of corner positions of the identified marker image. Then, step S207 is executed by the electronic apparatus for deciding a marker structure of the identified marker image according to the corner positions by the electronic apparatus, wherein the marker structure comprises a plurality of vertices. Thereafter, step S209 is executed by the electronic apparatus for selecting a portion of the vertices as a plurality of first feature points according to an identifier of the identified marker image by the electronic apparatus.

Next, step S211 is executed by the electronic apparatus for searching out a second feature point from a preset searching range for each of the first feature points by the electronic apparatus. Thereafter, step S213 is executed by the electronic apparatus for updating the vertices of the marker structure according to the second feature points by the electronic apparatus. It shall be appreciated that, in some embodiments, a regression algorithm may be used in the step S213 for updating the vertices of the marker structure according to the second feature points. Next, step S215 is executed by the electronic apparatus for selecting a portion of the updated vertices as a plurality of third feature points by the electronic apparatus. Thereafter, step S217 is executed by the electronic apparatus for calculating a position of the electronic apparatus in the space according to the third feature points by the electronic apparatus.

It shall be appreciated that, in some embodiments, the visual positioning method may further enable the electronic apparatus to execute a step (not shown) for calculating a position variation between the second feature points and the third feature points. If the position variation is greater than a preset value, the visual positioning method takes the third feature points as the first feature points to repeatedly execute the steps S211, S213, and S215 and calculate a position variation between the second feature points and the third feature points. The visual positioning method repeatedly executes the aforesaid steps until the position variation is smaller than the preset value. It shall be additionally appreciated that, in some embodiments, the visual positioning method takes the third feature points as the first feature points to repeatedly execute the steps S211, S213, and S215 for a predetermined number of times.

In addition to the aforesaid steps, the second embodiment can execute all the operations and steps of the visual positioning apparatus 1 set forth in the first embodiment, have the same functions, and deliver the same technical effects as the first embodiment. How the second embodiment executes these operations and steps, has the same functions, and delivers the same technical effects as the first embodiment will be readily appreciated by those of ordinary skill in the art based on the explanation of the first embodiment, and thus will not be further described herein.

The visual positioning method described in the second embodiment may be implemented by a computer program having a plurality of codes. The computer program may be stored in a non-transitory computer readable storage medium. After the codes of the computer program are loaded into an electronic apparatus (e.g., the visual positioning apparatus 1), the computer program executes the visual positioning method of the second embodiment. The non-transitory computer readable storage medium may be an electronic product, e.g., a read only memory (ROM), a flash memory, a floppy disk, a hard disk, a compact disk (CD), a mobile disk, a magnetic tape, a database accessible to networks, or any other storage media with the same function and well known to those of ordinary skill in the art.

It shall be appreciated that, in the specification and the claims of the present invention, the terms "first," "second," and "third" used in the first feature point, the second feature point, and the third feature point are only intended to represent that these feature points are feature points at different stages.

According to the above descriptions, the visual positioning technology according to the present invention searches out a plurality of corner positions of the identified marker image, decides a marker structure according to the corner positions, decides a plurality of first feature points according to the marker structure, searches out a second feature point near each of the first feature points, updates the marker structure according to the second feature points, and decides a plurality of third feature points according to the updated marker structure. By deciding the feature points for several times, the position of the finally decided third feature points is closer to the position of the actual feature points of the identified marker image and, therefore, the position of the visual positioning apparatus in the space can be determined more accurately.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A visual positioning apparatus, comprising:
   an image sensor, being configured to derive an image by sensing a visual code marker in a space; and
   a processor, being electrically connected to the image sensor and configured to execute the following operations: (a) identifying an identified marker image comprised in the image, (b) searching out a plurality of corner positions of the identified marker image, (c) deciding a marker structure of the identified marker image according to the corner positions, wherein the marker structure comprises a plurality of vertices and is a mesh formed by a plurality of grids, (d) selecting a portion of the vertices as a plurality of first feature points according to an identifier of the identified marker image, (e) searching out a position at which a variation of brightness is the largest from a preset searching range as a second feature point for each of the first feature points, (f) updating the vertices of the marker structure according to the second feature points, (g) selecting a portion of the updated vertices as a plurality of third feature points, and (h) calculating a position of the visual positioning apparatus in the space according to the third feature points.

2. The visual positioning apparatus of claim 1, wherein the processor updates the vertices of the marker structure according to the second feature points by a regression algorithm.

3. The visual positioning apparatus of claim 1, wherein the processor further executes the following operation: (i) calculating a position variation between the second feature points and the third feature points, wherein the processor further takes the third feature points as the first feature points to repeatedly perform the operations (e), (f), (g), and (i) until the position variation is smaller than a preset value.

4. The visual positioning apparatus of claim 1, wherein the processor further repeatedly executes the operations (e), (f), and (g) for a predetermined number of times.

5. A visual positioning method, being adapted to use in an electronic apparatus, the visual positioning method comprising:
(a) deriving an image by sensing a visual code marker in a space;
(b) identifying an identified marker image comprised in the image;
(c) searching out a plurality of corner positions of the identified marker image;
(d) deciding a marker structure of the identified marker image according to the corner positions, wherein the marker structure comprises a plurality of vertices and is a mesh formed by a plurality of grids;
(e) selecting a portion of the vertices as first feature points according to an identifier of the identified marker image;
(f) searching out a position at which a variation of brightness is the largest from a preset searching range as a second feature point for each of the first feature points;
(g) updating the vertices of the marker structure according to the second feature points;
(h) selecting a portion of the updated vertices as a plurality of third feature points; and
(i) calculating a position of the electronic apparatus in the space according to the third feature points.

6. The visual positioning method of claim 5, wherein the step (g) updates the vertices of the marker structure according to the second feature points by a regression algorithm.

7. The visual positioning method of claim 5, further comprising:
(j) calculating a position variation between the second feature points and the third feature points;
wherein the visual positioning method further takes the third feature points as the first feature points and repeatedly executes the steps (f), (g), (h), and (j) until the position variation is smaller than a preset value.

8. The visual positioning method of claim 5, further comprising:
taking the third feature points as the first feature points and repeatedly executing the steps (f), (g), and (h) for a predetermined number of times.

9. A non-transitory computer readable storage medium, having a computer program stored therein, the computer program executing a visual positioning method after being loaded into an electronic device, and the visual positioning method comprising:
(a) deriving an image by sensing a visual code marker in a space;
(b) identifying an identified marker image comprised in the image;
(c) searching out a plurality of corner positions of the identified marker image;
(d) deciding a marker structure of the identified marker image according to the corner positions, wherein the marker structure comprises a plurality of vertices and is formed by a plurality of grids;
(e) selecting a portion of the vertices as a plurality of first feature points according to an identifier of the identified marker image;
(f) searching out a position at which a variation of brightness is the largest from a preset searching range as a second feature point for each of the first feature points;
(g) updating the vertices of the marker structure according to the second feature points;
(h) selecting a portion of the updated vertices as a plurality of third feature points; and
(i) calculating a position of the electronic apparatus in the space according to the third feature points.

10. The non-transitory computer readable storage medium of claim 9, wherein the step (g) updates the vertices of the marker structure according to the second feature points by a regression algorithm.

11. The non-transitory computer readable storage medium of claim 9, wherein the visual positioning method further comprises:
(j) calculating a position variation between the second feature points and the third feature points;
wherein the visual positioning method further takes the third feature points as the first feature points and repeatedly executes the steps (f), (g), (h), and (j) until the position variation is smaller than a preset value.

12. The non-transitory computer readable storage medium of claim 9, wherein the visual positioning method further comprises:
repeatedly executing the steps (f), (g), and (h) for a predetermined number of times.

* * * * *